United States Patent
Yao et al.

(10) Patent No.: US 12,428,559 B2
(45) Date of Patent: Sep. 30, 2025

(54) CURABLE COMPOSITIONS AND METHODS OF MAKING AND USING THE SAME

(71) Applicant: 3M INNOVATIVE PROPERTIES COMPANY, St. Paul, MN (US)

(72) Inventors: Li Yao, Woodbury, MN (US); Erik M. Townsend, South St. Paul, MN (US); Susan E. DeMoss, Stillwater, MN (US); Jonathan D. Zook, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 673 days.

(21) Appl. No.: 17/765,744

(22) PCT Filed: Nov. 6, 2020

(86) PCT No.: PCT/IB2020/060473
§ 371 (c)(1),
(2) Date: Mar. 31, 2022

(87) PCT Pub. No.: WO2021/094887
PCT Pub. Date: May 20, 2021

(65) Prior Publication Data
US 2022/0372290 A1   Nov. 24, 2022

Related U.S. Application Data

(60) Provisional application No. 62/936,034, filed on Nov. 15, 2019.

(51) Int. Cl.
*C08L 81/02* (2006.01)
*C09J 181/02* (2006.01)

(52) U.S. Cl.
CPC ............. *C08L 81/02* (2013.01); *C09J 181/02* (2013.01)

(58) Field of Classification Search
None
See application file for complete search history.

(56) References Cited

U.S. PATENT DOCUMENTS

| | | |
|---|---|---|
| 4,609,762 A | 9/1986 | Morris et al. |
| 5,225,472 A | 7/1993 | Cameron et al. |
| 5,912,319 A | 6/1999 | Zook et al. |
| 5,959,071 A | 9/1999 | DeMoss et al. |
| 6,172,179 B1 | 1/2001 | Zook et al. |
| 6,486,297 B2 | 11/2002 | Zook et al. |
| 6,509,418 B1 | 1/2003 | Zook et al. |
| 10,287,466 B2 | 5/2019 | DeMoss et al. |
| 2004/0247792 A1 | 12/2004 | Sawant et al. |
| 2016/0032059 A1 | 2/2016 | Ye et al. |
| 2017/0362434 A1 | 12/2017 | Ye et al. |
| 2018/0016480 A1 | 1/2018 | DeMoss et al. |
| 2019/0144610 A1 | 5/2019 | Moser et al. |

FOREIGN PATENT DOCUMENTS

| | | |
|---|---|---|
| WO | WO 2016-106352 | 6/2016 |
| WO | WO 2016-130673 | 8/2016 |
| WO | WO 2016-176548 | 11/2016 |
| WO | WO 2017-004015 | 1/2017 |
| WO | WO 2017-044704 | 3/2017 |
| WO | WO 2018-005416 | 1/2018 |
| WO | WO 2018-085190 | 5/2018 |
| WO | WO 2018-085534 | 5/2018 |
| WO | WO 2019-064103 | 4/2019 |
| WO | WO 2020-095153 | 5/2020 |
| WO | WO 2020-191579 | 10/2020 |
| WO | WO 2021-074734 | 4/2021 |

OTHER PUBLICATIONS

Skrabala, "Enhanced Thermal Conductivity in Plate-shaped Polymer parts", AIP Conference proceedings, May 2014, vol. 1593, pp. 424-427.

International Search Report for PCT Application No. PCT/IB2020/060473 mailed on Feb. 25, 2021, 6 pages.

*Primary Examiner* — Robert T Butcher
(74) *Attorney, Agent, or Firm* — Julie Lapos-Kuchar

(57) ABSTRACT

A two-part curable composition comprises: a Part A component comprising polythiol having a thiol group functionality of at least two, and tertiary amine accelerator; and a Part B component comprising polyene comprising at least two of non-aromatic C—C double bonds, C—C triple bonds, or a combination thereof and organic peroxide curative. At least one of the polythiol or the polyene comprises a respective reaction product of reaction components comprising: $HSR^1O(CH_2CHR^2O)_aR^1SH$ wherein each $R^1$ independently represents an alkyl group having from 2 to 12 carbon atoms, each $R^2$ independently represents H or $CH_3$, and a represents an integer from 1 to 20; triallyl isocyanurate; $H_2{=}CHOR^1O(CH_2CHR^2O)_aR^1OCH{=}CH_2$; and. A method of making a curable composition comprises combining the Part A and Part B components of the two-part curable composition. Methods of sealing a substrate and adhering two substrates, and articles made thereby are also disclosed. (Formula AA).

(AA)

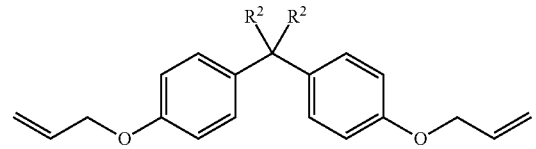

20 Claims, 1 Drawing Sheet

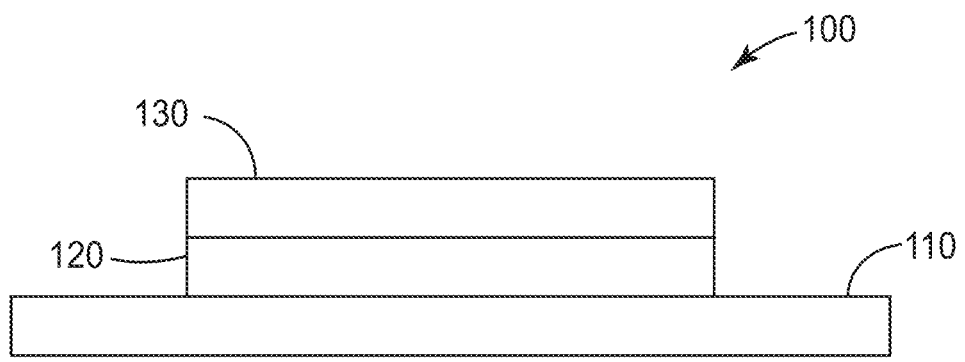

CURABLE COMPOSITIONS AND METHODS OF MAKING AND USING THE SAME

CROSS-REFERENCE TO RELATED APPLICATIONS

This application is a national stage filing under 35 U.S.C. 371 of PCT/IB2020/060473, filed Nov. 6, 2020, which claims the benefit of Provisional Application No. 62/936,034, filed Nov. 15, 2019.

TECHNICAL FIELD

The present disclosure broadly relates to curable compositions and methods of making and using the same.

BACKGROUND

Curable compositions are widely used in the chemical arts for applications such as, for example, sealants and adhesives. In general, the curable composition is at least partially cured to provide a usable end product. In some cases, the curable composition may be a single (one-part) composition that can be triggered (e.g., by light and/or heat) to cause curing. In other cases, it is preferable to separate the composition into two parts (two-part) that, when mixed, begin to cure. Such systems are known in the art as two-part curable compositions. The two separate parts of two-part compositions are commonly referred to in the art as Part A and Part B. Examples of curable compositions include curable sealants and adhesives.

The resultant cured compositions may need to be flexible and/or thermally conductive depending on the application. Electronics applications in particular may need to have good thermal conductivity to dissipate heat from various components and reliable performance (e.g., tensile strength, elongation at break, and/or storage modulus) over a wide temperature range (e.g., −30° C. to 60° C.).

SUMMARY

There is a continuing need for new materials that address one or more of the foregoing problems. Advantageously, the present disclosure provides compositions and methods that may exhibit a storage modulus with little temperature dependence under typical use conditions. Also, in some embodiments, the present disclosure provides cured compositions with good thermal conductivity, vibration damping, and/or toughness.

In a first aspect, the present disclosure provides a two-part curable composition comprising:
a Part A component comprising:
  polythiol having a thiol group functionality of at least two; and
  tertiary amine accelerator; and
a Part B component comprising:
  polyene comprising at least two of non-aromatic C—C double bonds, C—C triple bonds, or a combination thereof; and
  organic peroxide curative,
wherein at least one of the polythiol or the polyene comprises a respective reaction product of reaction components comprising:
  i) $HSR^1O(CH_2CHR^2O)_aR^1SH$
    wherein:
      each $R^1$ independently represents an alkyl group having from 2 to 12 carbon atoms,
      each $R^2$ independently represents H or $CH_3$, and
      a represents an integer from 1 to 20;
  ii) $CH_2{=}CHOR^1O(CH_2CHR^2O)_aR^1OCH{=}CH_2$;
  iii)

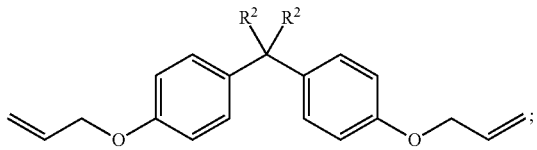

and
  iv) triallyl isocyanurate.

In another aspect, the present disclosure provides a method of making a curable composition, the method comprising combining the Part A and Part B components of the two-part curable composition according to the present disclosure.

In yet another aspect, the present disclosure provides a method of sealing a substrate, the method comprising:
  applying a curable composition made according to the present disclosure to a surface of the substrate; and
  at least partially curing the curable composition throughout its bulk.

In yet another aspect, the present disclosure provides a method of adhering two substrates, the method comprising:
  applying a curable composition made according to the present disclosure to a first surface of a first substrate;
  contacting the curable composition with a second surface of a second substrate; and
  at least partially curing the curable composition throughout its bulk.

In yet another aspect, the present disclosure provides an article comprising a first substrate having disposed thereon a reaction product of first components comprising:
a Part A component comprising:
  polythiol having a thiol group functionality of at least two; and
  tertiary amine accelerator; and
a Part B component comprising:
  polyene comprising at least two of non-aromatic C—C double bonds, C—C triple bonds, or a combination thereof; and
  organic peroxide curative,
wherein at least one of the polythiol or the polyene comprises a respective reaction product of reaction components comprising:
  i) $HSR^1O(CH_2CHR^2O)_aR^1SH$
    wherein:
      each $R^1$ independently represents an alkyl group having from 2 to 12 carbon atoms,
      each $R^2$ independently represents H or $CH_3$, and
      a represents an integer from 1 to 20;
  ii) $CH_2{=}CHOR^1O(CH_2CHR^2O)_aR^1OCH{=}CH_2$;
  iii)

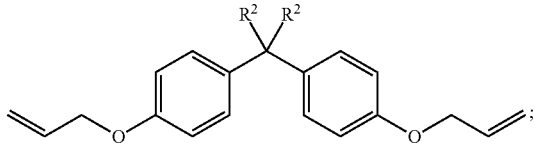

and
  iv) triallyl isocyanurate.

As used herein:
the term "polyolefin" refers to an unsaturated hydrocarbon having a total of two or more non-aromatic carbon-carbon double bonds and/or triple bonds; and
all numerical ranges are inclusive of their end points unless otherwise indicated.

Features and advantages of the present disclosure will be further understood upon consideration of the detailed description as well as the appended claims.

BRIEF DESCRIPTION OF THE DRAWING

The drawing is a schematic side view of an exemplary article 100 according to the present disclosure.

It should be understood that numerous other modifications and embodiments can be devised by those skilled in the art, which fall within the scope and spirit of the principles of the disclosure. The FIGURE may not be drawn to scale.

DETAILED DESCRIPTION

Curable compositions according to the present disclosure comprise a Part A component and a Part B component that are kept separated to prevent premature curing. When the curable composition is used, Part A and Part B are generally mixed together, e.g., using a static mixing nozzle or a powered mixing device, whereupon curing commences. Application of thermal energy (e.g., in an oven and/or exposure to infrared radiation) may be used to facilitate curing.

The Part A component comprises polythiol (i.e., at least one polythiol) having a thiol group functionality of at least two. Useful polythiols are organic compounds having at least two (e.g., at least 2, at least 3, at least 4, or even at least 6) thiol groups. To achieve chemical crosslinking between polymer chains in the curable composition, at least one of the polythiol(s) in the first component and/or at least one of the unsaturated compounds in the second component can have an average functionality of at least two. In some embodiments, the polythiol has an average thiol group functionality of 2.5 or greater, 2.75 or greater, 3 or greater, 3.25 or greater, 3.5 or greater, 3.75 or greater, or 4 or greater; and up to 6 average thiol group functionality.

In some embodiments, the polythiol is liquid (e.g., a viscous liquid having a viscosity of about 500-50,000 cP) at room temperature; however, this is not a requirement.

The polythiol can be an alkylene, arylene, alkylarylene, arylalkylene, or alkylenearylalkylene having at least two thiol groups, where any of the alkylene, alkylarylene, arylalkylene, or alkylenearylalkylene are optionally interrupted by one or more oxa (i.e., —O—), thia (i.e., —S—), or imino groups (i.e., —NR$^3$— wherein R$^3$ is a hydrocarbyl group or H), and optionally substituted by alkoxy or hydroxyl.

Exemplary useful dithiols include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethyl sulfide, methyl-substituted dimercaptodiethyl sulfide, dimethyl-substituted dimercaptodiethyl sulfide, dimercaptodioxaoctane, 1,5-dimercapto-3-oxapentane,benzene-1,2-dithiol, benzene-1,3-dithiol, benzene-1,4-dithiol, and tolylene-2,4-dithiol. Examples of polythiols having more than two thiol groups include propane-1,2,3-trithiol; 1,2-bis[(2-mercaptoethyl)thio]-3-mercaptopropane; tetrakis(7-mercapto-2,5-dithiaheptyl)methane; and trithiocyanuric acid.

Also useful are polythiols formed from the esterification of polyols with thiol-containing carboxylic acids or their derivatives. Examples of polythiols formed from the esterification of polyols with thiol-containing carboxylic acids or their derivatives include those made from the esterification reaction between thioglycolic acid or 3-mercaptopropionic acid and several polyols to form the mercaptoacetates or mercaptopropionates, respectively.

Examples of polythiol compounds that may be preferred because of relatively low odor level include, but are not limited to, esters of thioglycolic acid, α-mercaptopropionic acid, and β-mercaptopropionic acid with polyhydroxy compounds (polyols) such as diols (e.g., glycols), triols, tetrols, pentols, and hexols. Specific examples of such polythiols include, but are not limited to, ethylene glycol bis(thioglycolate), ethylene glycol bis(β-mercaptopropionate), trimethylolpropane tris(thioglycolate), trimethylolpropane tris(β-mercaptopropionate) and ethoxylated versions, pentaerythritol tetrakis(thioglycolate), pentaerythritol tetrakis(β-mercaptopropionate), and tris(hydroxyethyl)isocyanurate tris(β-mercaptopropionate). However, in those applications where concerns about possible hydrolysis of the ester exists, these polyols are typically less desirable.

Suitable polythiols also include those commercially available as THIOCURE PETMP (pentaerythritol tetra(3-mercaptopropionate)), TMPMP (trimethylolpropane tri(3-mercaptopropionate)), ETTMP (ethoxylated trimethylolpropane tri(3-mercaptopropionate) such as ETTMP 1300 and ETTMP 700), GDMP glycol di(3-mercaptopropionate), TMPMA (trimethylolpropane tri(mercaptoacetate)), TEMPIC (tris[2-(3-mercaptopropionyloxy)ethyl] isocyanurate), and PPGMP (propylene glycol 3-mercaptopropionate) from Bruno Bock Chemische Fabrik GmbH & Co. KG. A specific example of a polymeric polythiol is polypropylene-ether glycol bis(β-mercaptopropionate), which is prepared from polypropylene-ether glycol (e.g., PLURACOL P201, Wyandotte Chemical Corp.) and β-mercaptopropionic acid by esterification.

Suitable polythiols also include those prepayable by esterification of polyols with thiol-containing carboxylic acids or their derivatives, those prepared from a ring-opening reaction of epoxides with H$_2$S (or its equivalent), those prepared from the addition of H$_2$S (or its equivalent) across carbon-carbon double bonds, polysulfides, polythioethers, and polydiorganosiloxanes. Specifically, these include the 3-mercaptopropionates (also referred to as β-mercaptopropionates) of ethylene glycol and trimethylolpropane (the former from Chemische Fabrik GmbH & Co. KG, the latter from Sigma-Aldrich); POLYMERCAPTAN 805C (mercaptanized castor oil); POLYMERCAPTAN 407 (mercaptohydroxy soybean oil) from Chevron Phillips Chemical Co. LLP, and CAPCURE, specifically CAPCURE 3-800 (a polyoxyalkylenetriol with mercapto end groups, from Gabriel Performance Products, Ashtabula, Ohio, and GPM-800, which is equivalent to CAPCURE 3-800, also from Gabriel Performance Products.

Oligomeric or polymeric polythioether polythiols useful for practicing the present disclosure are also described in, for example, U.S. Pat. No. 4,609,762 (Morris et al.), U.S. Pat. No. 5,225,472 (Cameron et al.), U.S. Pat. No. 5,912,319 (Zook et al.), U.S. Pat. No. 5,959,071 (DeMoss et al.), and U.S. Pat. No. 6,509,418 (Zook et al.).

In some embodiments, the polythiol is oligomeric or polymeric. Examples of useful oligomeric or polymeric polythiols include polythioethers and polysulfides. Polythioethers include thioether linkages (i.e., —S—) in their backbone structures. Polysulfides include disulfide linkages (i.e., —S—S—) in their backbone structures.

Other useful polythiols can be formed from the addition of hydrogen sulfide ($H_2S$) (or its equivalent) across carbon-carbon double bonds. For example, dipentene and triglycerides which have been reacted with $H_2S$ (or its equivalent). Specific examples include dipentene dimercaptan and those polythiols available as POLYMERCAPTAN 358 (mercaptanized soybean oil) and POLYMERCAPTAN 805C (mercaptanized castor oil) from Chevron Phillips Chemical Co. LLP. At least for some applications, the preferred polythiols are POLYMERCAPTAN 358 and 805C since they are produced from largely renewable materials, i.e., the triglycerides, soybean oil and castor oil, and have relatively low odor in comparison to many thiols. Useful triglycerides have at least two sites of unsaturation, i.e., carbon-carbon double bonds, per molecule on average, and sufficient sites are converted to result in at least 2 thiols per molecule on average. In the case of soybean oil, this requires a conversion of approximately 42 percent or greater of the carbon-carbon double bonds, and in the case of castor oil this requires a conversion of approximately 66 percent or greater of the carbon-carbon double bonds. Typically, higher conversion is preferred, and POLYMERCAPTAN 358 and 805C can be obtained with conversions greater than approximately 60 percent and 95 percent, respectively. Useful polythiols of this type also include those derived from the reaction of $H_2S$ (or its equivalent) with the glycidyl ethers of bisphenol A epoxy resins, bisphenol F epoxy resins, and novolac epoxy resins. A preferred polythiol of this type is QX11, derived from bisphenol A epoxy resin, from Japan Epoxy Resins (JER) as EPOMATE. Other polythiols suitable include those available as EPOMATE QX10 and EPOMATE QX20 from JER.

Still other useful polythiols are polysulfides that contain thiol groups such as those available as THIOKOL LP-2, LP-3, LP-12, LP-31, LP-32, LP-33, LP-977, and LP-980 from Toray Fine Chemicals Co., Ltd., and polythioether oligomers and polymers such as those described in PCT Publ. No. WO 2016/130673 A1 (DeMoss et al.).

In some embodiments, the polythiol may include a primary thiol, a secondary thiol, or both.

In any embodiment, the polythiol may be present in the curable composition in an amount of 5% by weight or more, 7% by weight or more, 10% by weight or more, 12% by weight or more, 15% by weight or more, 17% by weight or more, 20% by weight or more, 22% by weight or more, 25% by weight or more, 27% by weight or more, or 30% by weight or more; and 55% by weight or less, 50% by weight or less, 45% by weight or less, 40% by weight or less, or 35% by weight or less, based on the total weight of the curable composition, although this not a requirement. In some embodiments, the polythiol may be present in an amount of 5% to 50% by weight or 10% to 35% by weight, based on the total weight of the curable composition.

Useful polythiols can be formed from the addition of hydrogen sulfide ($H_2S$) across carbon-carbon double bonds. For example, dipentene and triglycerides which can be reacted with $H_2S$. Specific examples include dipentene dimercaptan and polythiols available as POLYMERCAPTAN 358 (mercaptanized soybean oil) and POLYMERCAPTAN 805C (mercaptanized castor oil) from Chevron Phillips Chemical Co. LLP.

Useful polythiols of this type also include those derived from the reaction of $H_2S$ (or its equivalent) with the glycidyl ethers of bisphenol A epoxy resins, bisphenol F epoxy resins, and novolac epoxy resins. A preferred polythiol of this type is QX11, derived from bisphenol A epoxy resin, from Japan Epoxy Resins (JER) under the trade designation EPOMATE.

In another method, polyenes can be prepared by combining polythiol(s) (e.g., dithiols) with polyene(s) (e.g., dienes) using a stoichiometric excess of the polythiol, resulting in an oligomeric polythiol.

The amount of polythiol present in the curable composition can be from 5 percent to 90 percent, from 10 percent to 80 percent, from 20 percent to 80 percent, or in some embodiments, less than, equal to, or greater than 5 percent, 10, 15, 20, 25, 30, 35, 40, 45, 50, 55, 60, 65, 70, 75, 80, 85 or 90 percent by weight relative to the overall weight of the curable composition; however, this is not a requirement.

To avoid any premature or side reactions, Part A is preferably free of alkenes and/or polyenes (e.g., as described hereinbelow), although a minor amount may be acceptable in certain instances.

Part A includes at least one tertiary amine accelerator for peroxide curing. Typically, the amount of tertiary amine accelerator is up to 5 percent by weight, e.g., 0.1 to 5 percent by weight or 0.1 to 3 percent by weight, although other amounts may also be used. Examples of tertiary amine accelerators include dimethyl-p-toluidine (DMpT), bisdimethylaminodibenzyl, N,N-diisopropanoxy-p-toluidine, bis 4-(N,N-dimethylamino)phenethyl ester, N-ethyl-N-(2-hydroxyethyl)-m-toluidine, N,N-bis-(2-hydroxyethyl)-p-toluidine, 4-dimethylaminobenzoic acid, and trialkylamines such as, e.g., 1,4-diazabicyclo[2.2.2]octane (DABCO), trimethylamine, triethylamine, tetraethylmethylenediamine, tetramethylpropane-1,3-diamine, tetramethylhexane-1,6-diamine, pentamethyldiethylenetriamine, pentamethyldipropylenetriamine, bis(2-dimethylaminoethyl) ether, ethylene glycol (3-dimethyl)aminopropyl ether, dimethylaminoethanol, dimethylaminoethoxyethanol, N,N,N'-trimethylaminoethylethanolamine, dimethylcyclohexylamine, N,N-dimethylaminomethylphenol, N,N-dimethylpropylamine, N,N,N', N'-tetramethylhexamethylenediamine, N-methylpiperidine, N,N'-dimethylpiperazine, N,N-dimethylbenzylamine, dimethylaminomethylphenol, 2,4,6-tris(dimethylaminomethyl) phenol, 1,8-diazabicycloundec-7-ene, 1,5-diazabicyclo-non-5-ene, 6-dibutylamino-1,8-diazabicycloundec-7-ene, 1,2-dimethylimidazole, dimethylpiperazine, N-methyl-N'-(2-dimethylamino)-ethylpiperazine, N-methylmorpholine, N—(N',N'-(dimethylamino)ethyl)morpholine, N-methyl-N'-(2-hydroxyethyl)morpholine, triethylenediamine, hexamethylenetetramine, and combinations thereof.

Parts A and B may optionally, but often preferably, contain filler (i.e., at least one filler). Examples of commonly used fillers include: barium sulfate, alumina, alumina trihydrate, calcium silicate, clay, talc, titanium dioxide, silica, calcium carbonate, zeolite, carbon black, and fibers such as glass fiber, steel wire or mesh, nylon or polyester fiber, metal fiber, and combinations thereof. Examples of thermally conductive fillers include: alumina, alumina trihydrate, zinc oxide, silver, copper, aluminum, and alloys thereof; hexagonal boron nitride; aluminum nitride, silver-coated copper, silver-coated aluminum, and carbon fiber.

Filler in Parts A and B may be added in any amount; typically 30 to 95 percent by volume, preferably 40 to 95 percent by volume, more preferably 60-90 percent by volume, and more preferably from 70-85 percent by volume, based on the total volume of the cured composition. Thermal conductivity of the cured composition can range from 1.0 to 2.5 W/(m·K), most preferably from 1.4 to 2 W/(m·K).

Part B includes polyene (i.e., at least one polyene) comprising at least two of non-aromatic C—C double bonds, C—C triple bonds, or a combination thereof. In some preferred embodiments, the non-aromatic carbon-carbon double bonds correspond to vinyl groups.

In some embodiments, the polyene is represented by the general formula:

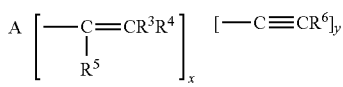

wherein:

A represents an x+y valent organic group (e.g., preferably consisting of C and H, but optionally substituted by hydroxy, alkoxy, acyloxy, carbonyl, acyloxy, carboalkoxy, and sulfur-based derivatives thereof, optionally substituted by one or more of S, N, F, and P), having from 1 to 8, 12, 18, 22, or even 30 carbon atoms;

each $R^3$, $R^4$, $R^5$, and $R^6$ independently represents H or an organic group (e.g., alkoxy, acyloxy, alkyl, or aryl) having from 1 to 8 carbon atoms (preferably 1 to 4, and more preferably 1 or 2 carbon atoms)), or $R^5$ and $R^6$ may together form a 5- or 6-membered ring; and x and y independently represent integers in the range of 0 to 6, wherein $1 \leq x+y \leq 6$ with the proviso that if y=0, then $x \geq 2$.

Examples of suitable unsaturated compounds include, for example, unsaturated hydrocarbon compounds having from 5 to 30 carbon atoms (preferably 5 to 18 carbon atoms) such as, for example, include 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,13-tetradecadiene, 1,15-hexadecadiene, 1,17-octadecadiene, 1,19-icosadiene, 1,21-docosadiene, divinylbenzene, dicyclopentadiene, limonene, diallylbenzene, triallylbenzene; polyvinyl ethers having from 4 to 30 carbon atoms (preferably 4 to 18) carbon atoms such as, for example, divinyl ether, ethylene glycol divinyl ether, 1,4-butanediol divinyl ether, 1,6-hexanediol divinyl ether, diethylene glycol divinyl ether, triethylene glycol divinyl ether, tetraethylene glycol divinyl ether, cyclohexanedimethanol divinyl ether, trimethylolpropane trivinyl ether, and pentaerythritol tetravinyl ether, bisphenol A divinyl ether, bisphenol F divinyl ether, bisphenol A diallyl ether, bisphenol F diallyl ether; diynes having from 5 to 30 carbon atoms (preferably 5 to 15 carbon atoms) such as, for example, 1,6-heptadiyne; isocyanurates having from 9 to 30 carbon atoms (preferably 9 to 15 carbon atoms) such as, for example, diallyl isocyanurate and triallyl isocyanurate; cyanurates having from 9 to 30 carbon atoms (preferably 9 to 15 carbon atoms) such as, for example, diallyl cyanurate, and triallyl cyanurate; and certain ethenyl and/or ethynyl-substituted polymers such as, for example, polytetrahydrofuryl divinyl ether, polyethylene oxide divinyl ether, polyethylene oxide diallyl ether, polypropylene oxide divinyl ether, polypropylene oxide diallyl ether, and mixtures thereof. Ethenyl and/or ethynyl-substituted polymers may have two, three, four, or more ethenyl (e.g., vinyl) and/or ethynyl (e.g., acetylenyl) pendant group and/or end groups. Compounds having both ethenyl and ethynyl groups may also be used. Combinations of the foregoing may be used.

In some embodiments, the carbon-carbon double and triple bonds are terminal groups in a linear aliphatic compound. In some embodiments, one or more of the carbon-carbon double and triple bonds are contained within carbocyclic ring structures having from 4-10 carbon atoms. In some cases, these ring structure may contain multiple fused or bonded rings or heteroatoms such as O, S or N. When using polythiols having two thiol groups, a mixture of unsaturated compounds may be useful in which at least one unsaturated compound has two carbon-carbon double or triple bonds, and at least one unsaturated compound has at least three carbon-carbon double or triple bonds.

In some embodiments, the polyene is represented by the formula:

$CH_2=CR^6—CHR^7—S—R^8—S—CHR^9—CR^{10}=CH_2$ where $R^6$, $R^7$, $R^9$, and $R^{10}$ are independently selected from H, methyl, or ethyl, and $R^8$ is selected from divalent groups comprising 2 to 12 carbon atoms, 0 to 5 ether oxygen atoms, and 0 to 5 thioether sulfur atoms, which may be straight, branched or cyclic. Typically $R^6$, $R^7$, $R^9$, and $R^{10}$ are independently selected from H and methyl. In some embodiments, one of $R^6$ and $R^7$ is H and the other is methyl, and one of $R^6$ and $R^{10}$ is H and the other is methyl. Typically, $R^6$ and $R^{10}$ are the same, and $R^7$ and $R^9$ are the same. In some embodiments, $R^6$ and $R^{10}$ are methyl and $R^7$ and $R^9$ are H. In some embodiments, $R^6$ and $R^{10}$ are H, and $R^7$ and $R^9$ are methyl. In some embodiments, $R^6$, $R^7$, $R^9$ and $R^{10}$ are H.

In some embodiments, $R^8$ is a divalent group represented by the formula:

$—((CH_2)_nZ)_m(CH_2)_n—$ where m is an integer from 0 to 5, each n is independently an integer selected from 2 to 6, and each Z is independently selected from O or S.

In some embodiments, $R^3$ is a divalent group represented by the formula:

$—(CH_2CH_2Z)_mCH_2CH_2—$ wherein m and Z are as previously defined.

Polyene may be synthesized by any suitable method. In some embodiments, a polythiol (e.g., a dithiol) is reacted with a halogenated alkene.

In another method, polyenes can be prepared by combining polythiol(s) (e.g., dithiols) with polyene(s) (e.g., dienes) using a stoichiometric excess of the polyene, resulting in an oligomeric polyene.

At least one of the polythiol or the polyene comprises a reaction product of components comprising:
  i) $HSR^1O(CH_2CHR^2O)_aR^1SH$, wherein each $R^1$, $R^2$ and a are as previously defined;
  ii) $CH_2=CHOR^1O(CH_2CHR^2O)_aR^1OCH=CH_2$, wherein each $R^1$, $R^2$ and a are as previously defined;
  iii)

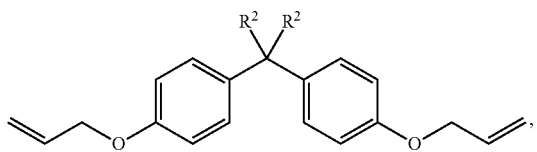

wherein $R^2$ is as previously defined;
  iv) triallyl isocyanurate; and optionally
  v) $CH_2=C(CH_3)CH_2SCH_2CH_2OCH_2CH_2OCH_2CH_2SCH_2C(CH_3)=CH_2$.

Components i)-v) may be combined in any relative amounts, for example, using stoichiometry as discussed above.

In some preferred embodiments, the components i)-iv) are present in a respective weight ratio of 35-55 parts by weight:30-50 parts by weight:8-12 parts by weight:1 part by weight. In some preferred embodiments, the components i)-iv) are present in a respective weight ratio of 38-52 parts by weight:33-47 parts by weight:8-12 parts by weight:1 part by weight. In some preferred embodiments, the components i)-iv) are present in a respective weight ratio of 35-55 parts by weight:30-50 parts by weight:9-11 parts by weight:1 part by weight.

In some preferred embodiments, the components i)-v) are present in a respective weight ratio of 35-55 parts by weight:30-50 parts by weight:8-12 parts by weight:1 part by weight:3-6 parts by weight. In some preferred embodiments, the components i)-v) are present in a respective weight ratio of 38-52 parts by weight:33-47 parts by weight:8-12 parts by weight:1 part by weight:3-6 parts by weight. In some preferred embodiments, the components i)-v) are present in a respective weight ratio of 35-55 parts by weight:30-50 parts by weight:9-11 parts by weight:1 part by weight:3-6 parts by weight. To avoid any premature or side reactions, Part A is preferably free of thiols and/or polythiols (e.g., as described hereinabove), although a minor amount may be acceptable in certain instances.

Part B includes at least one organic peroxide curative. Typically, the amount of organic peroxide curative is up to 5 percent by weight, e.g., 0.1 to 5 percent by weight or 0.1 to 3 percent by weight, although other amounts may also be used. Exemplary organic peroxide curatives include 1,1-di-(tert-amylperoxy)cyclohexane, 1,1-di-(tert-butylperoxy)-3,3,5-trimethylcyclohexane, 1,1-di-(tert-butylperoxy)cyclohexane, 2,2-di-(tert-butylperoxy)butane, 2,2-dihydroperoxypropane, 2,4-dichlorobenzoyl peroxide, 2,5-bis-(2-ethylhexanoylperoxy)-2,5-dimethylhexane, 2,5-dimethyl-2,5-di(benzoylperoxy)hexane, 2,5-dimethyl-2,5-di-(tert-butylperoxy)hex-3-yne, 2,5-dimethyl-2,5-dihydroperoxyhexane, 3,3,6,6,9,9-hexamethyl-1,2,4,5-tetraoxacyclononane, 3,3-di-(tert-butylperoxy)butyrate, 3-chloroperoxybenzoic acid, acetyl benzoyl peroxide, benzoyl peroxide (BPO), bis(2-phenethyl)benzoyl peroxide, bis-(4-tert-butylcyclohexyl) peroxide carbonate, bis(p-octyl)benzoyl peroxide, cumyl hydroperoxide, cyclohexanone peroxide, di-(2-phenoxyethyl) peroxydicarbonate, dicumyl peroxide, disuccinic acid peroxide, di-(tert-butyl) peroxide, methyl ethyl ketone peroxide, methyl isobutyl ketone peroxide, n-butyl-4,4-di-(tert-butylperoxy)valerate, tert-amyl peroxybenzoate, tert-butyl hydroperoxide, tert-butyl monoperoxymaleate, tert-butyl peroxy-2-ethylhexanoate, tert-butyl peroxy-3,5,5-trimethylhexanoate, tert-butyl peroxy-2-ethylhexylcarbonate, tert-butyl peroxyacetate, tert-butyl peroxybenzoate, tert-butyl peroxyisopropyl, carbonate, tert-butyl monoperoxymaleate, tert-butyl peroxy-2-methylbenzoate, and combinations thereof.

Preferably, the curable (and hence also the cured) composition is free of photoinitiator, although this is not a requirement.

Curable compositions according to the present disclosure are useful, for example, for sealing a substrate and/or adhering two substrates. To seal a substrate, including gap filling between bonded components in an electronic device, a curable composition (mixed Parts A and B) according to the present disclosure may be applied to a surface of the substrate. Any suitable method of application may be used including, for example, dispensing from a nozzle (e.g., a mixing nozzle). Once applied, the curable composition is at least partially (preferably at least substantially or even fully) cured. While time is generally sufficient to cause curing at room temperature, optional heating may be applied to accelerate curing.

Exemplary substrates may include, metal, polymer, glass, ceramic, and combinations thereof. Particular examples include electronic component assemblies, and aviation/aerospace components.

The curable composition may also be used to adhere two substrates. To adhere two substrates, a curable composition (mixed Parts A and B) according to the present disclosure may be applied to a surface of a first substrate. Any suitable method of application may be used including, for example, dispensing from a nozzle (e.g., a mixing nozzle). Next, a second surface of a second substrate is contacted with the curable composition, and the curable composition is at least partially (preferably at least substantially or even fully) cured. While time is generally sufficient to cause curing at room temperature, optional heating may be applied to accelerate curing.

The resultant articles are shown in the drawing. Referring now to the drawing, exemplary article 100 comprises first substrate 110, cured composition 120 according to the present disclosure is disposed on first substrate 110. If optional second substrate 130 is present, then cured composition 120 is sandwiched between the first and second substrates 110, 130.

SELECT EMBODIMENTS OF THE PRESENT DISCLOSURE

In a first embodiment, the present disclosure provides a two-part curable composition comprising:
a Part A component comprising:
  polythiol having a thiol group functionality of at least two; and
  tertiary amine accelerator; and
a Part B component comprising:
  polyene comprising at least two of non-aromatic C—C double bonds, C—C triple bonds, or a combination thereof; and
  organic peroxide curative,
wherein at least one of the polythiol or the polyene comprises a respective reaction product of reaction components comprising:
  i) $HSR^1O(CH_2CHR^2O)_aR^1SH$
    wherein:
      each $R^1$ independently represents an alkyl group having from 2 to 12 carbon atoms,
      each $R^2$ independently represents H or $CH_3$, and a represents an integer from 1 to 20;
  ii) $CH_2=CHOR^1O(CH_2CHR^2O)_aR^1OCH=CH_2$;
  iii)

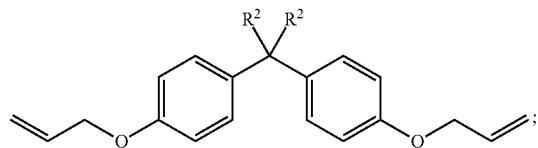

and
  iv) triallyl isocyanurate.

In a second embodiment, the present disclosure provides a two-part curable composition according to the first embodiment, wherein the reaction components further comprise:

In a third embodiment, the present disclosure provides a two-part curable composition according to the first or second embodiment, wherein the polythiol comprises a polythioether polythiol.

In a fourth embodiment, the present disclosure provides a two-part curable composition according to any of the first to third embodiments, wherein the polyene comprises a polythioether polyene.

In a fifth embodiment, the present disclosure provides a two-part curable composition according to any of the first to fourth embodiments, wherein the polyene comprises at least one of an allyl ether or a vinyl ether.

In a sixth embodiment, the present disclosure provides a two-part curable composition according to any of the first to fifth embodiments, wherein the polyene comprises the reaction product of the reaction components.

In a seventh embodiment, the present disclosure provides a two-part curable composition according to any of the first to sixth embodiments, wherein the polythiol comprises the reaction product of the reaction components.

In an eighth embodiment, the present disclosure provides a two-part curable composition according to any of the first to seventh embodiments, wherein:
a) the Part A comprises a first filler;
b) the Part B comprises a second filler; or
c) both a) and b).

In a ninth embodiment, the present disclosure provides a two-part curable composition according to the eighth embodiment, wherein at least one of the first or second filler has a thermal conductivity of at least 10 W/m-K.

In a tenth embodiment, the present disclosure provides a two-part curable composition according to the eighth embodiment, wherein at least one of the first or second filler has a thermal conductivity of at least 25 W/m-K.

In an eleventh embodiment, the present disclosure provides a method of making a curable composition, the method comprising combining the Part A and Part B components of the two-part curable composition according to any of the first to tenth embodiments.

In a twelfth embodiment, the present disclosure provides a method of sealing a substrate, the method comprising:
applying a curable composition made according to the eleventh embodiment to a surface of the substrate; and
at least partially curing the curable composition throughout its bulk.

In a thirteenth embodiment, the present disclosure provides a method of adhering two substrates, the method comprising:
applying a curable composition made according to the eleventh embodiment to a first surface of a first substrate;
contacting the curable composition with a second surface of a second substrate; and
at least partially curing the curable composition throughout its bulk.

In a fourteenth embodiment, the present disclosure provides a method according to the thirteenth embodiment, wherein at least one of the first or second substrates comprises an electrical component.

In a fifteenth embodiment, the present disclosure provides an article comprising a first substrate having disposed thereon a reaction product of first components comprising:
a Part A component comprising:
polythiol having a thiol group functionality of at least two; and tertiary amine accelerator; and
a Part B component comprising:
polyene comprising at least two of non-aromatic C—C double bonds, C—C triple bonds, or a combination thereof; and
organic peroxide curative,
wherein at least one of the polythiol or the polyene comprises a respective reaction product of reaction components comprising:
i) $HSR^1O(CH_2CHR^2O)_aR^1SH$
wherein:
each $R^1$ independently represents an alkyl group having from 2 to 12 carbon atoms,
each $R^2$ independently represents H or $CH_3$, and
a represents an integer from 1 to 20;
ii) $CH_2\!=\!CHOR^1O(CH_2CHR^2O)_aR^1OCH\!=\!CH_2$;
iii)

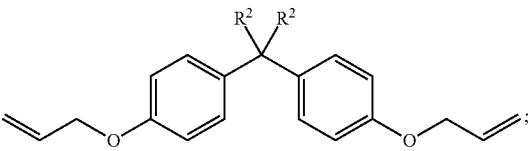

and
iv) triallyl isocyanurate.

In a sixteenth embodiment, the present disclosure provides an article according to the fifteenth embodiment, wherein the reaction components further comprise:

$CH_2\!=\!C(CH_3)$
$CH_2SCH_2CH_2OCH_2CH_2OCH_2CH_2SCH_2C$
$(CH_3)\!=\!CH_2$.

In a seventeenth embodiment, the present disclosure provides an article according to the fifteenth or sixteenth embodiment, further comprising a second substrate, wherein the reaction product of first components is sandwiched between the first and second substrates.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Table 1, below reports materials used in the Examples.

TABLE 1

| ABBREVIATION | DESCRIPTION | SUPPLIER |
|---|---|---|
| PTE-1 | liquid poly(thioether), thiol-terminated, polythiol | synthesis provided hereinbelow |
| PTE-2 | liquid poly(thioether), thiol-terminated, polythiol | synthesis provided hereinbelow |

TABLE 1-continued

| ABBREVIATION | DESCRIPTION | SUPPLIER |
|---|---|---|
| PTE-3 | liquid poly(thioether), ene-terminated, polyene | synthesis provided hereinbelow |
| GABEPRO GPM-800 | thiol-terminated polymer liquid curing agent, polythiol | Gabriel Chemicals, Akron, Ohio |
| KARENZ MT PE1 | pentaerythritol tetrakis(3-mercaptobutylate), polythiol | Showa Denko, Tokyo, Japan |
| DVE-3 | tri(ethylene glycol) divinyl ether, polyene | BASF, Florham Park, New Jersey |
| DAEBPA | diallyl ether of bisphenol A | Bimax, Glen Rock, Pennsylvania |
| TAIC | triallylisocyanurate | Arkema, King of Prussia, Pennsylvania |
| TVC | 1,2,4-trivinylcyclohexane | BASF |
| CMP diene | Difunctional monomer | synthesis provided hereinbelow |
| EPALLOY 8220 | very low viscosity epoxidized Bisphenol F resin, difunctional epoxy monomer | CVC Thermoset Specialties, Moorestown, New Jersey |
| CMP | 3-chloro-2-methyl-1-propene | MilliporeSigma, Louis, Missouri |
| DABCO33-LV | 33% triethylenediamine dissolved in 67% dipropylene glycol | Evonik, Parsippany, New Jersey |
| LUPEROX TBEC | tert-Butylperoxy 2-ethylhexyl carbonate | AkzoNobel, Chicago, Illinois |
| MOLDX A110 | alumina trihydrate filler | Huber Engineered Materials, Atlanta, Georgia |
| CAB-O-SIL TS-720 | fumed silica | CABOT, Boston, Massachusetts |
| DISPERBYK-145 | phosphoric acid ester salt of a high molecular weight copolymer with pigment affinic groups, dispersant | BYK-Chemie, Wesel, Germany |
| VAZO 67 | 2,2'-azodi(2-methylbutyronitrile), thermal radical initiator | The Chemours Company, Wilmington, Delaware |
| VAZO 52 | 2-2'-Azobis(2,4-dimethylvaleronitrile), thermal radical initiator | The Chemours Company |
| PRIAMINE 1074 | dimer diamine | Croda, Edison, New Jersey |
| EP-4000 | bisphenol A-propylene oxide-modified glycidyl ether epoxy resin | Adeka, Tokyo, Japan |
| EPON 828 | difunctional bisphenol A/epichlorohydrin-derived liquid epoxy resin | Hexion, Columbus, Ohio |
| SILQUEST A-189 | gamma-mercaptopropyl-trimethoxysilane | Momentive, Columbus, Ohio |
| XIAMETER OFS-6040 | 99% active glycidoxypropyl trimethoxysilane | Dow Chemical, Midland, Michigan |
| ANCAMINE K54 | tris-2,4,6-dimethylaminomethyl phenol | Evonik |

Test Methods
Tensile Properties Testing

For tensile strength measurement, dogbone-shaped samples were made in accordance with ASTM D1708-13, "Standard Test Method for Tensile Properties of Plastics by Use of Microtensile Specimens" by pressing the mixed paste into a dogbone-shaped silicone rubber mold, which was then laminated with release liner on both sides. The dogbone shape gives a sample with a length of about 0.6 inch (1.5 cm) in the center straight area, a width of about 0.2 inch (0.5 cm) in the narrowest area, and a thickness of about 0.06 to about 0.1 inch (about 1.5 mm to about 2.5 cm). Samples were then cured at room temperature for 7 to 12 days to be fully cured prior to tensile testing.

Tensile strength tests were conducted on an INSTRON Universal Testing Machine model 1122 (INSTRON Corporation, Norwood, Massachusetts) according to ASTM D638-14, "Standard Test Method for Tensile Properties of Plastics." The crosshead speed was 0.04 inch/minute (1 mm/minute).

Thermal Conductivity Testing

The thermal conductivity of Example 1 was measured using disk-shaped samples made by pressing the mixed paste into a disk-shaped silicone rubber mold, which was then laminated with release liner on both sides. The disk shape gives samples with a diameter of 12.6 mm and a thickness of 2.2 mm. The sample was then cured at room temperature for at least 7 days. Specific heat capacity, $C_p$, was measured using a Q2000 Differential Scanning calorimeter (TA Instruments, Eden Prairie, Minnesota) with sapphire as a method standard.

Sample density was determined using a geometric method. The weight (m) of a disk-shaped sample was measured using a standard laboratory balance, the diameter (d) of the disk was measured using calipers, and the thickness (h) of the disk was measured using a Mitutoyo micrometer. The density, $\rho$, was calculated by $\rho = m/(\pi \cdot h \cdot (d/2)^2)$.

Thermal diffusivity, $\alpha(T)$, was measured using an LFA 467 HYPERFLASH Light Flash Apparatus (Netzsch Instruments, Burlington, MA, US) according to ASTM E1461-13, "Standard Test Method for Thermal Diffusivity by the Flash Method."

Thermal conductivity, k, was calculated from thermal diffusivity, heat capacity, and density measurements according the formula: $k = \alpha C_p \rho$ where k is the thermal conductivity in W/(m·K), α is the thermal diffusivity in mm$^2$/s, $C_p$ is the specific heat capacity in J/K-g, and ρ is the density in g/cm$^3$.

The thermal conductivity of Examples 2-4 was measured according to ASTM D5470 ("Standard Test Method for Thermal Transmission Properties of Thermally Conductive Electrical Insulation Materials") using the Thermal Interface Material Tester Model TIMI1300 from AnalysisTech (Wakefield, Massachusetts). 33-mm discs were cut out of the densified squares using a hole punch. The test temperature was 50° C. and the applied test pressure was set to 100 psi (0.689 MPa). The instruments thickness gauge was used to measure the thickness of the sample during testing.

Dielectric Breakdown Strength

Dielectric breakdown strength measurements were performed according to ASTM D149-09(2013), "Standard Test Method for Dielectric Breakdown Voltage and Dielectric Strength of Solid Electrical Insulating Materials at Commercial Power Frequencies" using a Model 6TC4100-10/50-2/D149 Automated Dielectric Breakdown Test Set (Phenix Technologies, Accident, MD, US) that is specifically designed for testing DC breakdown from 3 to 100 kV and AC breakdown in the 1 to 50 kV, 60 Hz range. Each measurement was performed while the sample was immersed in FLUORINERT FC-40 fluid (3M Company, Saint Paul, Minnesota). The average breakdown strength was based on an average of measurements up to 10 or more samples. As is typical, a frequency of 60 Hz and a ramp rate of 500 volts per second was utilized for these tests.

Electrical Resistivity

Surface resistivity and volume resistivity were measured with a Model 6517A Electrometer (Keithley Instruments, Cleveland, Ohio) with 100 femtoamp resolution and an applied voltage of 500 volts according to ASTM D257-14, "Standard Test Methods for DC Resistance or Conductance of Insulating Materials." A Keithley Model 8009 Resistivity test fixture was used with compressible conductive rubber electrodes and 1 lb (0.45 kg) electrode force over approximately 2.5 inches (6.4 cm) of electrode and sample. The samples were approximately 18 mils (0.46 mm) thick. The corresponding detection threshold for surface resistivity is approximately 1017 ohms. Each sample was measured once, and an electrification time of 60 seconds was employed. A high-resistance sample (PTFE), a low-resistance sample (bulk loaded carbon in Kapton), and a moderate-resistance sample (paper) were used as material reference standards.

Climate Aging Test

Climate aging and hydrolytic stability cycling was performed according to the BMW SAE PR308.2, "Climatic Test for Bonded Joints" standard. At least 5 test specimens were tested, which were pre-cured for at least 7 days at room temperature. A single test cycle included 7 steps: Step 1: Start at 23° C. at 20% relative humidity (RH); Step 2: Ramp up to 90° C. and 80% RH in 1 hour; Step 3: Stay at 90° C. and 80% RH for 4 hours; Step 4: Cool and dehumidify the system to 23° C. and 20% RH; Step 5: Cool the system to −30° C. in 1 hour; Step 6: Stay at −30° C. for 4 hours; Step 7: Heat the system to 23° C. and 20% RH in 1 hour. 20 cycles were required to complete the aging test. Physical properties of the cured compositions were measured before and after PR308.2 cycling.

Rheology Measurement

Storage modulus (G') and loss modulus (G") were measured using a 25 mm parallel-plate geometry at 1% strain on a Discovery HR-3 Rheometer (TA Instruments, Wood Dale, Illinois) equipped with a forced convection oven accessory, using oscillating mode at angular frequencies of 100 rad/s at 25° C. for time study. "Open time" of the compositions was defined as the time at which G'=0.3 MPa, and the "gelation time" was defined as the time at which G'=G".

Dynamic Mechanical Analysis (DMA)

Storage modulus (G') was collected on DMA Q800 (TA Instruments) or DMA G2 RSA (TA Instruments) equipped with a sample chamber mounts to the DMA in place of the standard furnace to precisely control the temperature to +/−0.1° C. The specimen was made and cut into a rectangular geometry with length of 8-15 mm, width of 6-7 mm, and thickness of 1-2 mm. The measurements used temperature sweep from −30° C. to 60° C. at 1 Hz frequency with 15 micron oscillating amplitude and 0.01 N static force.

Synthesis of 4,13-dithia-7,10-dioxa-2,15-dimethyl-hexadecyl-1,15-diene (CMP Diene)

Into a 500-ml four-neck, round bottom flask fitted with a stirrer, thermometer, chilled water condenser and a pressure equalizing addition funnel was added 206.54 g of 20% aqueous sodium hydroxide (52.0 wt. %, 1.033 moles). To this aqueous base solution was added, dropwise with stirring, 94.08 grams (23.7 wt. %, 0.51 moles) of 1,8-dimercapto-3,6-dioxaoctane (DMDO). The mixture was allowed to cool to room temperature after which 96.4 grams (24.3 wt. %, 1.065 moles) of 3-chloro-2-methyl-1-propene (CMP) was added dropwise with vigorous stirring. The mixture was allowed to stir for 2 hours. After standing overnight, 150 grams of a clear layer was decanted.

Synthesis of Liquid Poly(thioether), PTE-1

Into a 100-mL round bottom flask equipped with an air-driven stirrer, thermometer, and a dropping funnel, was added 39.64 grams (0.22 mole) of DMDO and 4.10 grams (0.0125 mole) of Epalloy 8220. DABCO (0.02 g, 0.02 weight percent) was mixed in as a catalyst. The system was flushed with nitrogen, then mixed and heated for 1.5 hours at 60-70° C. CMP diene (3.66 g, 0.0125 mole) was added along with approximately 0.01 g VAZO 52. The material was mixed and heated at approximately 60° C. for 1.5 hrs. Trivinylcyclohexane (0.83 g, 0.005 mole) was added and heating continued for another 1.5 hrs. triethylene glycol divinyl ether (DVE-3, 31.80 g, 0.157 moles) was then added dropwise to the flask over 45-60 minutes, keeping the temperature at approximately 70° C. VAZO 52 was added in approximately 0.01 g units over approximately 16 hours for a total of about 0.4 g. The temperature was raised to 100° C. and the material degassed for approximately 10 minutes. The resultant polythioether was approximately 3200 g/mol molecular weight with 2.2 functionality.

Synthesis of Liquid Poly(thioether)s, PTE-2, and PTE-3

The formulation used in the synthesis of Poly(thioether)s 2 and 3 is reported in Table 2.

The synthesis of liquid poly(thioether)s was conducted in a 250-mL 3-neck round bottom flask. TAIC was added into the flask followed by DAEBPA and then DMDO. Joints of the flask were greased, then a nitrogen purge tube, a thermometer and a stirring rod attached to a mechanical stirring system were immersed under the liquid through different necks. After turning on the nitrogen and stirring the solution with the stirring rod, a heating mantle was put on and the flask was heated to 60° C. The temperature of the thermometer was maintained between 65° C. and 80° C. while slowly adding VAZO 67. After around 2.5 h, 0.02-0.05 g aliquots were taken and dissolved in 50 ml toluene/MEK (1:1) solution with 1 ml pyridine added. Iodine solution (0.1 N in water) was then used to titrate the solution to confirm whether the reaction was finished or not. After the first step of the reaction was done, a 125-ml addition funnel with DVE-3 was placed on the 3-neck round bottom flask. 10% of the DVE-3 was added into the flask together with another portion of VAZO 67 while maintaining the temperature between 65° C. and 80° C. by alternating between cold bath and heating mantle Once the temperature stabilized, the rest of the DVE-3 in the funnel was added into the flask dropwise while the solution temperature was maintained between 65° C. and 80° C. After another iodine titration to confirm the reaction was done, the mechanical stirring system was removed, and the flask was transferred to a stir plate system with a magnetic stir bar. The nitrogen purge tube was removed, but the thermometer remained immersed in the solution. The reaction solution was then heated under vacuum. Once the temperature reached 100° C. for 5 min, the heating mantle was taken off and the reaction solution was allowed to cool under static vacuum. After the temperature dropped below 70° C., the batch was vented, and samples were taken for the final iodine titration as well as rheology measurements.

PTE-1 was synthesized with the formulation in Table 2 to yield an equivalent weight of 1465 g/eq based on thiol terminal groups. PTE-2 was synthesized with the formulation in Table 5 to yield an equivalent weight of 1282 based on thiol terminal groups. PTE-3 was synthesized to yield a theoretical equivalent weight of 1250 g/eq, where the chain was terminated with ene.

TABLE 2

| COMPONENT | PTE-1, parts by weight | PTE-2, parts by weight | PTE-3, parts by weight |
|---|---|---|---|
| DMDO | 49.3 | 49.9 | 41.8 |
| CMP Diene | 4.6 | | |
| DAEBPA | | 10.3 | 10.3 |
| EPALLOY 8220 | 5.1 | | |
| DVE-3 | 39.5 | 38.7 | 46.8 |
| TVC | 1.03 | | |
| DABCO | 0.02 | | |
| TAIC | | 1.0 | 1.0 |
| Vazo 67 | | 0.1 | 0.1 |
| Vazo 52 | 0.5 | | |

Table 3, below, reports properties of polythiols PTE-1 and PTE-2 and polyene PTE-3.

TABLE 3

| | PTE-1 | PTE-2 | PTE-3 |
|---|---|---|---|
| Thiol: (ene or epoxy) mole ratio | 1.16:1 | 1.19:1 | 1:1.17 |
| Equivalent weight (g/eq) (based on thiol) | 1465 | 1282.2 | 57790 |
| Equivalent weight (g/eq) (based on ene) | N/A | N/A | 1250 |
| Viscosity @ 25° C. and 100 rad/sec (cps) | 8335.2 | 5171.3 | 6124.0 |

Examples E-1 to E-4

Table 4 reports the formulations of Examples E-1 to E-4. Parts A and B of each formulation were mixed in the ratios specified in Table 4, below.

TABLE 4

| | EXAMPLE, parts by weight | | | |
|---|---|---|---|---|
| COMPONENT | E-1 | E-2 | E-3 | E-4 |
| PART A | | | | |
| PTE-1 | | 19.68 | | |
| PTE-2 | 19.68 | | | |
| GABEPRO GPM-800 | | | 19.63 | |
| KARENZ MT PEI | | | | 19.60 |
| DABCO33-LV | 0.05 | 0.05 | 0.27 | 0.46 |
| MOLDX A110 | 78.70 | 78.70 | 78.52 | 78.38 |
| DISPERBYK-145 | 1.57 | 1.57 | 1.57 | 1.57 |
| PART B | | | | |
| PTE-3 | 19.62 | 19.62 | 19.65 | 19.65 |
| LUPEROX TBEC | 0.33 | 0.33 | 0.16 | 0.16 |
| MOLDX A110 | 78.48 | 78.48 | 78.61 | 78.61 |
| DISPERBYK-145 | 1.57 | 1.57 | 1.57 | 1.57 |
| Mixing ratio (A:B by wt.) | 1:1 | 1.23:1 | 1:5.9 | 1:8.7 |

Comparative Example CE-A

Table 5 reports the formulations of Comparative Example CE-A. Parts A and B were mixed in the ratios specified in Table 5, below.

TABLE 5

| COMPONENT | COMPARATIVE EXAMPLE CE-A, parts by weight |
|---|---|
| Part A | |
| PRIAMINE 1074 | 6.97 |
| GABEPRO GPM-800 | 16.26 |
| SILQUEST A-189 | 2.90 |
| ANCAMINE K54 | 2.79 |
| MOLDX A110 | 69.69 |
| DISPERBYK-145 | 1.39 |
| Part B | |
| EP-4000 | 9.37 |
| EPON-828 | 14.05 |
| OFS-6040 | 2.69 |
| MOLDX A110 | 70.60 |
| CAB-O-SIL TS720 | 1.87 |
| DISPERBYK-145 | 1.41 |
| Mixing ratio (A:B wt. %) | 0.95:1 |

Table 6, below, reports mechanical performance of compositions Examples E-1 to E-4 fully cured at room temperature (r.t.).

TABLE 6

| | EX-1 | EX-2 | EX-3 | EX-4 |
|---|---|---|---|---|
| CURING CONDITION, days at r.t. | 7 | 10 | 10 | 10 |
| TENSILE STRENGTH, MPa | 0.27 | 0.21 | 0.18 | 0.372 |
| % ELONGATION AT BREAK | 140 | 119 | 41.2 | 18.4 |

Table 7 reports DMA modulus measurements for Comparative Example CE-A and Examples E-1 to E-4. DMA module measurements were conducted using a DMA Q800 for Comparative Example CE-A and Example E-1 and using a G2 RSA for Examples E-2 to E-4, with temperature sweep from −30° C. to 60° C. at 1 Hz frequency. Comparative Example CE-A was a thiol-epoxy based system that showed large changes in modulus with temperature sweep (modulus ratio at −30° C. versus 60° C. was 133), while the modulus of polythiol/polyene system of Examples E-1 to E-4 remained within the range of 1 to 120 MPa through −30° C. to 60° C. (modulus ratio at −30° C. versus 60° C. was below 25).

TABLE 7

| DMA Modulus, MPa | CE-A | EX-1 | EX-2 | EX-3 | EX-4 |
|---|---|---|---|---|---|
| at −30° C. | 12408 | 47.9 | 26.8 | 21.5 | 115.6 |
| at 25° C. | 167 | 9.2 | 2.0 | 2.5 | 54.5 |
| at 60° C. | 93 | 6.4 | 1.1 | 2.3 | 53.6 |
| RATIO OF DMA Modulus at −30° C./ DMA Modulus at −60° C. | 133 | 7.5 | 24.3 | 9.3 | 2.2 |

Table 8, below, reports thermal conductivity of Examples EX-1 through EX-4 after full curing at room temperature.

TABLE 8

|  | EX-1 | EX-2 | EX-3 | EX-4 |
|---|---|---|---|---|
| Thermal Conductivity, W/m · K | 1.48 | 2.05 | 1.49 | 2.00 |

Table 9, below, reports surface/volume resistivity and breakdown strength of Example EX-1 after full curing at room temperature.

TABLE 9

|  | Surface Resistivity, Ω/□ | Volume Resistivity, Ω · cm | Breakdown Strength, kV/mm |
|---|---|---|---|
| EX-1 | $2.0 \times 10^{11}$ | $5.2 \times 10^{9}$ | 18.80 |

The preceding description, given in order to enable one of ordinary skill in the art to practice the claimed disclosure, is not to be construed as limiting the scope of the disclosure, which is defined by the claims and all equivalents thereto.

What is claimed is:

1. A two-part curable composition comprising:
a Part A component comprising:
polythiol having a thiol group functionality of at least two; and
tertiary amine accelerator; and
a Part B component comprising:
polyene comprising at least two of non-aromatic C=C double bonds, C—C triple bonds, or a combination thereof; and
organic peroxide curative,
wherein at least one of the polythiol or the polyene comprises a respective reaction product of reaction components comprising:
i) $HSR^1O(CH_2CHR^2O)_aR^1SH$
wherein:
each $R^1$ independently represents an alkyl group having from 2 to 12 carbon atoms,
each $R^2$ independently represents H or $CH_3$, and
a represents an integer from 1 to 20;
ii) $CH_2\!\!=\!\!CHOR^1O(CH_2CHR^2O)_aR^1OCH\!\!=\!\!CH_2$;
iii)

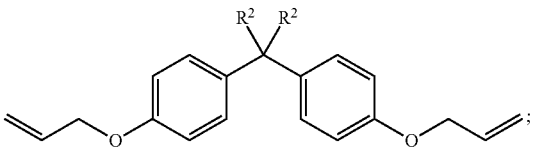

and
iv) triallyl isocyanurate, wherein Part A and Part B are two separate parts.

2. The two-part curable composition of claim 1, wherein the reaction components further comprise:

3. The two-part curable composition of claim 1, wherein the polythiol comprises a polythioether polythiol.
4. The two-part curable composition of claim 1, wherein the polyene comprises a polythioether polyene.
5. The two-part curable composition of claim 1, wherein the polyene comprises at least one of an allyl ether or a vinyl ether.
6. The two-part curable composition of claim 1, wherein the polyene comprises the reaction product of the reaction components.
7. The two-part curable composition of claim 1, wherein the polythiol comprises the reaction product of the reaction components.
8. The two-part curable composition of claim 1, wherein:
a) the Part A comprises a first filler;
b) the Part B comprises a second filler; or
c) both a) and b).
9. An article comprising a first substrate having disposed thereon a reaction product of first components comprising:
a Part A component comprising:
polythiol having a thiol group functionality of at least two; and
tertiary amine accelerator; and
a Part B component comprising:
polyene comprising at least two of non-aromatic C=C double bonds, C—C triple bonds, or a combination thereof, and
organic peroxide curative,
wherein at least one of the polythiol or the polyene comprises a respective reaction product of reaction components comprising:
i) $HSR^1O(CH_2CHR^2O)_aR^1SH$
wherein:
each $R^1$ independently represents an alkyl group having from 2 to 12 carbon atoms,
each $R^2$ independently represents H or $CH_3$, and
a represents an integer from 1 to 20;
ii) $CH_2\!\!=\!\!CHOR^1O(CH_2CHR^2O)_aR^1OCH\!\!=\!\!CH_2$;
iii)

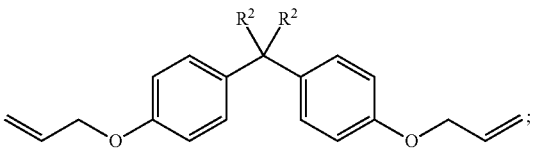

and iv) triallyl isocyanurate, wherein both Parts A and B are free of a photoinitiator.

10. The article of claim 9, further comprising a second substrate, wherein the reaction product of first components is sandwiched between the first and second substrates.

11. The two-part curable composition of claim 1, wherein the polythiol has a viscosity of about 500-50,000 centipoise at room temperature.

12. The two-part curable composition of claim 1, wherein the polythiol is oligomeric or polymeric.

13. The two-part curable composition of claim 1, wherein the curable composition comprises 5% by weight or more and 55% by weight or less of the polythiol.

14. The two-part curable composition of claim 1, wherein Part A is free of alkene and polyenes.

15. The two-part curable composition of claim 1, wherein the two-part curable composition is free of a photoinitiator.

16. The two-part curable composition of claim 1, wherein the polyene is of the following formula:

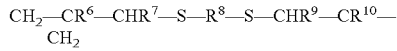
$$CH_2\!=\!CR^6\!-\!CHR^7\!-\!S\!-\!R^8\!-\!S\!-\!CHR^9\!-\!CR^{10}\!=\!CH_2$$

where $R^6$, $R^7$, $R^9$, and $R^{10}$ are independently selected from H, methyl, or ethyl, and $R^8$ is selected from divalent groups comprising 2 to 12 carbon atoms, 0 to 5 ether oxygen atoms, and 0 to 5 thioether sulfur atoms, which may be straight, branched or cyclic.

17. The two-part curable composition of claim 16, wherein $R^8$ is a divalent group represented by the formula:

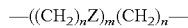
$$-((CH_2)_nZ)_m(CH_2)_n-$$

where m is an integer from 0 to 5, each n is independently an integer selected from 2 to 6, and each Z is independently selected from O or S.

18. The two-part curable composition of claim 1, wherein the polyene is an oligomeric polyene.

19. The two-part curable composition of claim 1, wherein reaction components comprising: 35-55 parts by weight of component i), 35-50 parts by weight of component ii), 8-12 parts by weight of component iii), and 1 part by weight of component iv.

20. A kit comprising:
a first part comprising:
polythiol having a thiol group functionality of at least two; and
tertiary amine accelerator; and
a second part component comprising:
polyene comprising at least two of non-aromatic C=C double bonds, C—C triple bonds, or a combination thereof, and
organic peroxide curative,
wherein at least one of the polythiol or the polyene comprises a respective reaction product of reaction components comprising:
i) $HSR^1O(CH_2CHR^2O)_aR^1SH$
wherein:
each $R^1$ independently represents an alkyl group having from 2 to 12 carbon atoms,
each $R^2$ independently represents H or $CH_3$, and
a represents an integer from 1 to 20;
ii) $CH_2\!=\!CHOR^1O(CH_2CHR^2O)_aR^1OCH\!=\!CH_2$;
iii)

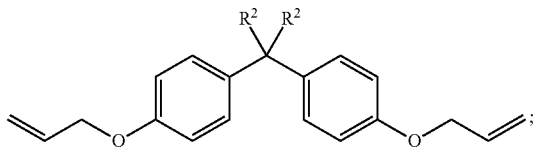

and
iv) triallyl isocyanurate.

* * * * *